VARIABLE PERMITIVITY DEVICE AND PROCESS THEREFOR
Filed Nov. 29, 1963
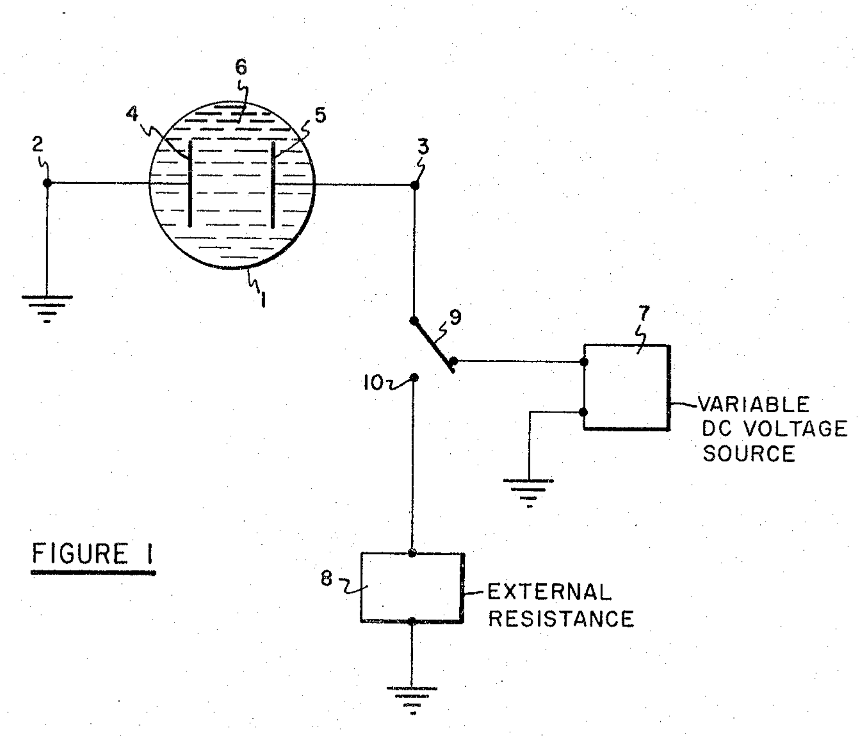
FIGURE I
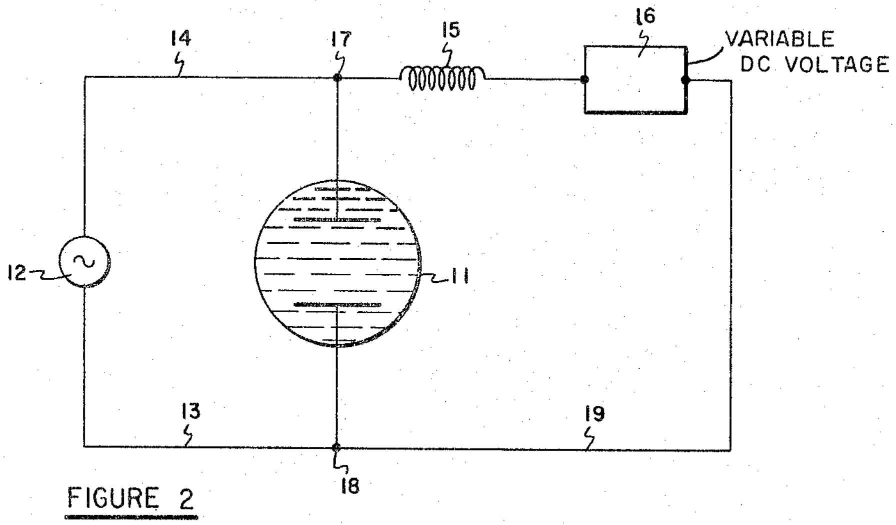
FIGURE 2
Eric O. Forster
Norvell E. Wisdom, Jr.
INVENTORS
BY Frank A. Vinnock
PATENT ATTORNEY United States Patent Office 3,309,606
Patented Mar. 14, 1967

3,309,606
VARIABLE PERMITIVITY DEVICE AND PROCESS THEREFOR

Eric O. Forster, Scotch Plains, and Norvell E. Wisdom, Jr., Elizabeth, N.J., assignors to Esso Research and Engineering Company, a corporation of Delaware Filed Nov. 29, 1963, Ser. No. 326,980
11 Claims. (Cl. 323—93)

This invention relates to novel electrical devices. More particularly this invention is concerned with a method and apparatus for controlling the flow of electricity through liquid hydrocarbon materials. Most particularly this invention relates to novel aromatic hydrocarbon liquid-containing electric circuit elements and storage devices.

Capacitors generally comprise two conducting plates separated by a dielectric. These devices store a quantity of electrical charge Q which is directly proportional to the capacitance C and the potential difference V between the conducting plates. The capacitance itself is normally a function of the geometric characteristics of the capacitor and the characteristics of the dielectric material and may be represented by the following formula $$C=\frac{\epsilon A}{4\pi d}$$

where C equals the capacitance, $\epsilon$ is the dielectric constant, A equals the area of the conducting plates and $d$ equals the distance between the conducting plates. Thus the capacitance is normally independent of the potential difference between the conducting plates.

The ability of a capacitor to accumulate energy makes it useful as a storage device in addition to its application as a frequency sensitive circuit element. In the normal capacitor the total amount of energy which is capable of being stored and the rate at which such energy may be dissipated is dependent upon the strength and adsorption characteristics of the dielectric and the resistive elements in the external circuit to which the capacitor is connected. The strength of the dielectric material is an important factor since it represents a limitation on the amount of voltage which the dielectric may safely withstand without rupture. Since, as previously mentioned, the charge is proportional to the voltage, it is apparent that the dielectric strength represents an important limitation on the storage capabilities of a capacitor. The total charge on the capacitor is normally thought to be accumulated on the conducting plates since the dielectric material is essentially an insulator and is therefore ideally incapable of passing or storing electrons. It is known, however, that some charge is absorbed in the dielectric for the purpose of polarizing the molecules of which said dielectric material is composed. This phenomenon, known as dielectric absorption, does not take place instantaneously upon the application of voltage to the capacitive element and thus represents a limitation on the charging rate of the capacitor. Furthermore this absorption characteristic is thought to account for the residual charge normally found on capacitive elements after discharge. The chief rate determining step in the dissipation of the accumulated energy for the normal capacitor is the resistance of the external circuit to which said capacitor is connected. Thus, since the bulk of the stored energy is on the conducting plates, the rate of discharge is essentially determined by factors in the external environment rather than by limitations in the capacitive element itself.

It is an object of this invention to provide a novel capacitive circuit element and storage device.

It is another object of this invention to provide a novel capacitor in which the capacitance is dependent upon the applied voltage.

A further object of this invention is to provide a storage device of high dielectric strength which is capable of storing energy at higher voltages than is possible with existing devices.

It has now been found that aromatic liquids of high dielectric strength and low D.C. dielectric constant can be used as a medium between metal electrodes to produce electric circuit elements of variable electric permitivity to alternating currents dependent on the magnitude of the D.C. bias. A further feature of this invention is the discovery that the cells containing the metal electrodes and the aromatic medium may be utilized to store, reversibly, electrical energy. These cells distinguish themselves from previously used electrochemical systems in that they do not involve ionic type electrode reactions resulting in storage of electrical energy in the form of chemical potential but are using electrical energy per se for storage in the form of charged particles which do not undergo any chemical reactions except for transfer of electrons between ions, neutral molecules and a metallic conductor.

While not wishing to be bound by any particular theory, it is now believed that the unique capacitive and storage characteristics of an electric cell containing an aromatic liquid and particularly benzene are due to the presence of a non-linear electrical field and the net negative charge in the liquid medium as well as a unique variation in the observed capacitance with changes in the D.C. bias of the electric cell. Experimental evidence indicates that the actual charge on a cell containing benzene as a dielectric medium is greater than the charge that would be derived from a calculation involving the cell geometry, the dielectric constant of the benzene and the applied voltage across the electrodes of the cell as described in this specification. These results support the existence in the benzene of a net charge. There seems to be no reason to imagine that pure benzene should exhibit an intrinsic tendency to create appreciable negative charge. Consequently the existence of a net negative steady state electric charge in conducting benzene requires the existence of some process for injecting negative charges or removing positive charges by an external agent. It appears that the injection of electrons appears to be the most likely charge source, although the preferential removal of positive ions may not at present be excluded. The preference for the injection-of-electron theory is based on experimental measurements of space charge density in the aromatic liquid containing electrical cell. These experiments indicate that the charge density distribution between the electrodes is not linear but rather is characterized by a high density barrier of electrons at the anode of the cell and a low charge density at the cathode. It is believed that the high space charge density at the anode acts as a barrier to the flow of electrons through the aromatic liquid and thus, the dissipation of stored energy in the cell is determined not only by the resistances in the external environment but also by the internal electron barrier. Thus, the aromatic liquid-containing capacitive cell, as compared to a more conventional capacitor, is unique in that it exhibits a dielectric absorption characteristic which is uncommon to the latter type cell and, due to the low space charge density at the cathode, is capable of a rapid charge build-up.

In accordance with this invention, the above discovered principles have now been employed to provide novel electrical storage devices and circuit elements. For example, in one embodiment the novel aromatic liquid containing cell may be employed as an electret, i.e., an energy storage device, by polarizing the cell with a high direct current voltage for a period of time sufficient to create a reservoir of electric charges which may be dissipated over a variable time interval. In another embodiment, the novel cells of this invention may be employed in combination with a D.C. bias to produce voltage dependent capacitors which have utility in a wide variety of A.C. circuits such as microwave transmission lines.

The invention will be further understood by reference to the following drawings wherein:

FIGURE 1 represents a diagrammatic illustration of the novel cell of this invention, and FIGURE 2 is a circuit diagram of one embodiment employing the voltage dependent capacitor of this invention.

Referring more particularly to the drawings, FIGURE 1 represents one possible embodiment of the novel cell of this invention. As shown the cell consists of a container 1 which houses a pair of electrodes 4 and 5 immersed in a liquid dielectric medium 6. The entire cell component is sealed within container 1, leaving only the external leads 2 and 3, which are connected to electrodes 4 and 5, and the outer wall of the container exposed to the ambient atmosphere when in use.

In operation, the cell is charged by application of a direct current from a variable D.C. voltage source 7. The switch 9 remains open (as shown) during the charging sequence. When a sufficient charge has been built up in the cell the switch 9 is moved to the closed position 10 so that the cell may act as an energy source for the external resistance or operational load 8. Thus, the circuit which includes the points 3, 7 and 9 represents the charging sequence of the novel storage cell while the circuit including the points 3, 8 and 10 represent the discharging sequence of the cell when it is acting as the energy source.

Turning now to FIGURE 2, a simple illustrative circuit employing the cell of FIGURE 1 as a voltage dependent capacitor is depicted. The cell 11 is connected in series with A.C. circuit lines 13 and 14 which in turn are linked to a source of A.C. voltage 12. Thus, the cell 11 represents a capacitive circuit element in the A.C. circuit. It is to be understood that the cell 11 may be employed in a wide variety of complex A.C. circuit arrangements and the simple circuit is shown only for the purpose of illustrating the principles of this invention. A D.C. circuit represented by points 17 and 18 and line 19 is connected to cell 11. This D.C. arrangement includes a coil 15 to prevent mixing of the A.C. and D.C. currents and a source of variable D.C. voltage 16. In operation changes in the output of variable D.C. voltage source 16 are reflected as capacitance changes in cell 11 and therefore in the A.C. circuit.

The container 1 of FIGURE 1 may be fabricated of any material which is not subject to chemical attack by the liquid dielectric medium 6. Suitable materials include glass, non-porous ceramics and plastics such as Teflon, polystyrene, polyethylene and polypropylene.

The selection of the liquid dielectric medium is a critical feature of this invention since not all liquid hydrocarbons exhibit the unique characteristics previously described in this specification. These characteristics are believed to be associated with the presence of $\pi$ electrons in the molecular structure of the hydrocarbon and its ability to readily accept another electron and transmit it to another neutral hydrocarbon molecule. The liquid dielectric medium should therefore be selected from the type of hydrocarbon material containing at least one double bond per molecule. Materials meeting this requirement are straight chain or cyclic mono-, di- and polyolefins containing 5 to 50 carbon atoms and preferably 6 to 15 carbon atoms. Particularly preferred dielectric mediums are aromatic hydrocarbons containing the number of carbon atoms specified above.

The liquid materials employed in this invention must be carefully purified to eliminate polar impurities including trace amounts of moisture. These impurities should be held below a level of 1 part per million and preferably less than 0.1 part per million. The presence of dissolved gases in the liquid medium, such as oxygen, nitrogen and carbon dioxide, is not objectionable although their presence should be avoided if ultimate dielectric strength is desired in a particular application.

The liquids employed in this invention are further characterized by their high dielectric strength as evidenced by their ability to withstand the application of high voltage without breaking down. This characteristic enables the cells of this invention to store energy at higher voltage than is capable with existing devices when acting as a storage unit and gives the cell a greater range of capacitance variation when acting as a voltage dependent capacitive circuit element. The D.C. voltage which may safely be applied to the novel cells of this invention is normally in the range of 10 to 5,000 volts and in some instances may range as high as 10,000 volts. When utilizing the preferred liquid, benzene, voltages as high as 8,000 to 9,000 volts may be applied without adverse effect.

The selection of electrodes is not a critical feature of this invention and a wide variety of metals may be employed for this purpose. Preferred metals are those which are capable of being produced with highly smooth surfaces. Typical metal electrodes which may be employed in the novel devices of this invention are platinum, silver, nickel, gold and stainless steel with platinum group metals of the Periodic Table being preferred e.g. platinum, palladium, iridium, osmium, ruthenium and rhodium.

The electrode spacing and surface area are critical features of this invention. While the novel cell has been shown in FIGURE 1 as comprising two parallel plates the cell geometry is not restricted to such an arrangement and other systems such as concentric circular plates or combinations of cylindrical and flat plates are equally amenable to use in the system of this invention. The cell geometry in terms of electrode spacing is critical since the unique storage capability and capacitive behavior of the cells are dependent on the space charge density and distribution as previously described in this specification. Thus the realization of the full benefits derivable from the cell of this invention is obtained only when the electrode spacing is minimized. Suitable electrode spacings for this invention are in the range of 0.001 to 0.2 cm. and preferably 0.005 to 0.1 cm. Electrode area may be chosen at will to produce capacitors of whatever magnitude is desirable for particular applications, within the limits of reasonable physical size. For example, electrode areas of 10 to 1,000 $cm.^2$ are suitable for use in the novel cell of this invention although greater and smaller areas may also be employed.

The invention will be further understood by reference to the following illustrative examples.

*Example 1*

Two platinum electrodes having a total area of 10 $cm.^2$ were immersed in a container of benzene and maintained at a separation of 0.05 cm. in a manner similar to that described in FIGURE 1. A D.C. field of 1,000 volts was applied across the electrodes for a period of 3 minutes. The stored charge in the cell was measured and found to be $10^{-7}$ coulombs. The cell was then connected to an external resistance of $10^{+10}$ ohms and discharged over a period of 48 hours. 95% of the stored electric charge was removed in this manner over the specified time interval.

*Example 2*

A conventional variable air capacitor was charged using a 5,000-volt D.C. source. The maximum charge stored in the capacitor was found to be $1.5\times10^{-6}$ coulombs. The air capacitor was then immersed in a beaker of highly purified benzene which was open to dry air and was charged in the same fashion as described above. The maximum charge on the immersed capacitor was found to be $1.5\times10^{-5}$ coulombs which is approximately 10 times the value obtained for the capacitor charged in the air. In another experiment the capacitor was charged while immersed in cyclohexane and a maximum value of $3\times10^{-6}$ coulombs was obtained.

The reported dielectric constants for air, cyclohexane and benzene are 1, 1.92 and 2.28 respectively. Since the total charge is proportional to the capacitance and the capacitance is directly proportional to the dielectric constant, it would be expected that the maximum charges obtainable in each of the above described experiments would be in the same ratio as their dielectric constants. The results, therefore, indicate the unique storage capabilities of benzene since the total charge is four times the charge which would be expected. On the other hand, the charge on the capacitor having cyclohexane as dielectric does not greatly exceed the expected value.

The air, benzene and cyclohexane capacitors charged in the manner described above were discharged through identical extend loads. The discharge rates of the air and cyclohexane capacitors were comparable while the discharge rate of the benzene capacitor was considerably slower as illustrated in Example 1. The slow discharge rate is also indicative of the unique storage capacity of the cells of this invention.

*Example 3*

The non-linear variation of charge accumulation and hence of capacitance with applied D.C. voltage in benzene was demonstrated in a special cell in which the separation of two platinum electrodes could be changed continuously. The cell was maintained at 25° C. As described previously in this specification, the capacitance is normally believed to be dependent on cell geometry. Thus at constant applied voltage the variation of the plate spacing should be reflected in the amount of total charge. The results of a comparison between an air-filled and a benzene-filled cell are tabulated below.

TABLE I

[Total Charge Accumulated at 100 v.]

| Plate Separation | Air | Benzene | Electric Field |
|---|---|---|---|
| 0.265 cm | $1.5\times10^{-10}$ coul./cm.$^3$ | $1.95\times10^{-9}$ | 377 volts/cm. |
| 0.525 cm | $0.75\times10^{-10}$ coul./cm.$^3$ | $1.61\times10^{-9}$ | 191 volts/cm. |
| 1.067 cm | $0.37\times10^{-10}$ coul./cm.$^3$ | $0.93\times10^{-9}$ | 99 volts/cm. |

The results indicate that the change in total charge on the air cell was directly proportional to the change in capacitance caused by doubling the plate separation as would be expected from classical capacitance theory. No such uniform variation was observed in the benzene cell. Thus it must be concluded that at constant voltage the accumulated charge in the benzene cell was affected by changes in capacitance other than the change caused by doubling the plate separation. Since the only other variable in the system was the intensity of the electric field the results indicate the voltage dependence of the benzene cell.

Similar measurements carried out at 45° and 65° C. produced identical results and indicate the independence of the benzene cell from temperature variations. In addition, similar results were achieved at higher and lower applied voltages.

It can readily be seen that the novel cells of this invention possess unique properties which would make them available for a variety of applications. For example, banks of cells acting as storage units could be utilized as portable sources of electricity for driving small appliances. Such units would be readily rechargeable and long lived. When employed as circuit elements the novel cells of this invention have the advantage of allowing selection of a desired capacitance without interrupting the circuit in which they are contained.

Having thus described the general nature and specific embodiments of the invention the true scope will now be pointed out by the appended claims.

What is claimed is:

1. A variable permitivity capacitive circuit element comprising a pool of $C_5$–$C_{50}$ unsaturated liquid hydrocarbon having an impurity level below 1 part per million and a pair of metal electrodes immersed in said liquid, said electrodes being separated from each other at a distance of 0.001 to 0.20 cm.

2. The element of claim 1 wherein said electrodes are connected to a variable direct current potential source.

3. The element of claim 1 wherein said electrodes and said liquid are sealed in an inert container.

4. The element of claim 1 wherein said metal electrodes are selected from the group consisting of platinum, palladium, iridium, osmium, ruthenium and rhodium.

5. The element of claim 1 wherein said unsaturated liquid hydrocarbon contains 6 to 15 carbon atoms.

6. The element of claim 5 wherein said liquid is an aromatic hydrocarbon.

7. The element of claim 1 wherein said liquid is benzene.

8. In combination with an alternating current circuit, a variable permitivity capacitive circuit element operatively connected therein, said element comprising a pool of a $C_6$–$C_{50}$ unsaturated liquid hydrocarbon having an impurity level below 1 part per million and a pair of electrodes immersed therein and spaced from each other at a distance of 0.001 to 0.20 cm., a source of direct current potential connected to said electrodes and means for varying said potential, said permitivity being responsive to the variation of the potential.

9. The combination of claim 8 wherein a coil is connected between said electrode and said source of direct current potential to prevent mixing of the alternating and direct current circuit.

10. The combination of claim 9 wherein said unsaturated hydrocarbon contains 6 to 15 carbon atoms.

11. The combination of claim 9 wherein said unsaturated liquid hydrocarbon is benzene.

References Cited by the Examiner

UNITED STATES PATENTS

| | | | |
|---|---|---|---|
| 464,667 | 12/1891 | Tesla | 317—242 |
| 1,886,235 | 12/1932 | Meissner | 317—258 X |
| 1,944,730 | 1/1934 | Clark | 317—258 X |
| 2,362,428 | 11/1944 | Biggs et al. | 252—63.7 X |
| 2,946,937 | 7/1960 | Herbert | 317—258 |
| 2,986,524 | 5/1961 | Padgett. | |

JOHN F. COUCH, *Primary Examiner.*

A. D. PELLINEN, *Assistant Examiner.*